US008484551B2

(12) United States Patent
Petersen (10) Patent No.: US 8,484,551 B2
(45) Date of Patent: Jul. 9, 2013

(54) CREATING INPUT FIELDS IN ELECTRONIC DOCUMENTS

(75) Inventor: Scott E. Petersen, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1875 days.

(21) Appl. No.: 10/236,610

(22) Filed: Sep. 5, 2002

(65) Prior Publication Data

US 2004/0049740 A1   Mar. 11, 2004

(51) Int. Cl.
  *G06F 15/00*   (2006.01)

(52) U.S. Cl.
  USPC ............................. 715/221; 715/222; 715/247

(58) Field of Classification Search
  USPC ............. 715/526, 505, 507, 508, 506, 221–2, 715/247
  See application file for complete search history.

(56) References Cited

U.S. PATENT DOCUMENTS

| | | | |
|---|---|---|---|
| 5,140,650 A | 8/1992 | Casey et al. | |
| 5,317,646 A | 5/1994 | Sang, Jr. et al. | |
| 5,616,905 A * | 4/1997 | Sugiyama | 235/456 |
| 5,742,836 A * | 4/1998 | Turpin et al. | 715/507 |
| 6,031,544 A | 2/2000 | Yhann | |
| 6,298,157 B1 * | 10/2001 | Wilensky | 382/199 |
| 6,345,278 B1 | 2/2002 | Hitchcock et al. | 707/100 |
| 6,351,573 B1 * | 2/2002 | Schneider | 382/294 |
| 6,490,376 B1 * | 12/2002 | Au et al. | 382/290 |
| 6,490,601 B1 * | 12/2002 | Markus et al. | 715/507 |
| 6,493,704 B1 * | 12/2002 | Hichwa et al. | 707/3 |
| 6,639,593 B1 | 10/2003 | Yhann | |
| 6,859,911 B1 | 2/2005 | Herasimchuk | |
| 2001/0028359 A1 * | 10/2001 | Muraishi et al. | 345/700 |
| 2003/0115025 A1 * | 6/2003 | Lee et al. | 703/1 |

OTHER PUBLICATIONS

Padova, Ted; Acrobat PDF Bible; May 1999; John wiley & Sons; Chapter 11, pp. 385-423.*
Courter, Gini; Marquis, Annette; Mastering Microsoft Office 2000 Professional Edition; May 1999; Sybex; p. 232.*
Duncan, Judy; SQL Windows Development Tools; Jan. 13, 1992; InfoWorld, v14n2, pp. 75-87.*
John Deubert, "*Creating Adobe Acrobat Forms*", Chapter 4, "*The Form Tool*", 2002, Peachpit Press, Berkeley, California.
Caere Corporation, "*OmniForm Users Manual*", Chapters , 3, 4, 5, and 6.
European Patent Office Supplementary Search Report for European Patent Application No. 03 794 625.8, dated Jul. 7, 2007, 7 pages.
International Preliminary Examination Report for PCT Application No. PCT/US2003/27842, dated Mar. 15, 2005, 9 pages.
International Search Report for PCT Application No. PCT/US2003/27842, dated Feb. 2, 2004, 6 pages.
European Official Action for Application No. EP 03 794 625.8-1527, dated Feb. 7, 2011, 7 pages.

* cited by examiner

*Primary Examiner* — Nathan Hillery
(74) *Attorney, Agent, or Firm* — Finch & Maloney PLLC (57) ABSTRACT

Computer programs and computer-implemented methods implement techniques for generating input fields (including form fields, sketch fields, text fields, and the like) in electronic documents. These include representing an electronic document to a user, receiving user input specifying a location in the electronic document, identifying one or more graphical elements in the electronic document, and generating an input field in the electronic document at the specified location based at least in part on the identified graphical elements. The techniques can also include receiving user input entering information into the generated input field and storing the generated input field.

21 Claims, 4 Drawing Sheets

FIG._1

| Attendance: X = on time; T = tardy (T5 = Tardy 5 min.); NS = No Show<br>Dress Code: X = in dress code/professional attire; U = Unacceptable<br>Participation: X = excellent; V = average; * = did not participate<br>Audit/Test: X( )% = passed (and percentage); R = retest; * - no audit | | Attendance | | | | | Dress Code | Participation | Audit/Test |
|---|---|---|---|---|---|---|---|---|---|
| Name | Branch | Morning | Break | Lunch | Break | Break | | | |
| | | | | | | | | | |

CREATING INPUT FIELDS IN ELECTRONIC DOCUMENTS

BACKGROUND

The present invention relates to the creation of input fields in electronic documents.

It has become increasingly common to create, transmit, and display documents in electronic format. Electronic documents have a number of advantages over paper documents including their ease of transmission, their compact storage, and their ability to be edited and/or electronically manipulated. A page in an electronic document can include various types of graphical elements, including text, line art, and images. Electronic documents are generally created by computer programs (also called application programs or simply applications) that can be executed by a user on a computer to create and edit electronic documents and to produce (directly or indirectly) printed output defined by the documents. Such programs include the Adobe Illustrator® and Photoshop® products, both available from Adobe Systems Incorporated of San Jose, Calif. Computer programs typically maintain electronic documents as document files that can be saved on a computer hard drive or a floppy diskette. An electronic document does not necessarily correspond to a document file. An electronic document can be stored in a portion of a document file that holds other documents, in a single document file dedicated to the electronic document in question, or in multiple coordinated document files. Graphical elements in electronic documents can be represented in vector form, raster form, or in hybrid forms.

An electronic document is provided by an author, distributor or publisher (referred to as "publisher" herein) who often desires that the document be viewed with a particular appearance, such as the appearance with which it was created. A portable electronic document can be viewed and manipulated on a variety of different platforms and can be presented in a predetermined format where the appearance of the document as viewed by a reader is as it was intended by the publisher. One such predetermined format is the Portable Document Format (PDF) developed by Adobe Systems Incorporated. An example of page-based software for creating, reading, and displaying PDF documents is the Adobe Acrobat® program, also of Adobe Systems Incorporated. The Adobe Acrobat® program is based on Adobe's PostScript® technology, which describes formatted pages of a document in a device-independent fashion. An Adobe Acrobat® program on one platform can create, display, edit, print, annotate, etc. a PDF document produced by another Adobe Acrobat® program running on a different platform, regardless of the type of computer platform used. A document in a certain format or language can be translated into a PDF document using the Adobe Acrobat® program. A PDF document can be quickly displayed on any computer platform having the appearance intended by the publisher, allowing the publisher to control the final appearance of the document.

Electronic documents can include one or more interactive digital input fields (referred to as "input fields" herein) for receiving information from a user. An input field (including any information provided by a user) can be associated with a document file of an electronic document either directly or indirectly. Different types of input fields include form fields, sketch fields, text fields, and the like. Form fields are typically associated with electronic documents that seek information from a user. Form fields provide locations at which a user can enter information onto an electronic document. A text form field allows a user to enter text (e.g., by typing on a keyboard). Other types of form fields include buttons, check boxes, combo boxes, list boxes, radio buttons, and signature fields. Sketch fields are typically associated with electronic documents that contain graphical illustrations and/or artwork. Sketch fields provide locations at which a user can add graphical illustrations and/or artwork to an electronic document, such as by manipulating a pointing tool such as a mouse or digitizing pen. Generally, text fields can be associated with any electronic document. Text fields are locations at which a user can add text to an electronic document.

A publisher or user can generate an input field, such as a form field for a PDF document using an Adobe Acrobat® form tool. Conventionally, an input field is generated by defining an area of the input field, naming (or labeling) the input field, and specifying its type (e.g., form field, sketch field, text field, and the like). The area of the input field is typically defined by selecting a location in the electronic document and specifying a shape or size of the input field—e.g., by using a pointing device to draw a shape representing an input field of the required size.

Input fields can also be generated with software programs that automatically detect the presence of one or more possible input field locations in an electronic document. Typically, once a possible field location is detected, the software program generates an input field automatically at the location without the aid of a publisher or user.

SUMMARY

The invention provides methods and apparatus, including computer program apparatus for generating input fields in an electronic document. Different types of input fields include form fields, sketch fields, text fields, and the like.

In general, in one aspect, the invention features computer-implemented methods and apparatus, including computer program apparatus, implementing techniques for generating input fields in an electronic document. The techniques include representing an electronic document to a user, receiving user input specifying a location in the electronic document, identifying one or more graphical elements in the electronic document, and generating an input field in the electronic document at the specified location based at least in part on the identified graphical elements.

Particular implementations can include one or more of the following features. An electronic document can be represented to a user by displaying the electronic document on a monitor. The user input specifying a location can be received in an authoring mode or a fill-in mode of an application program representing the electronic document. The authoring mode is a mode of operation of the application program during which a user is able to design an appearance of the electronic document. The fill-in mode is a mode of operation of the application program during which a user is able to enter information into input fields (including pre-defined or pre-existing input fields) in the electronic document. The input field can be generated in response to an input specifying a single coordinate location in the electronic document. The single coordinate location can be specified by a single action of a pointing device.

User input selecting an input field type-specific tool can be received. An input field having a type specified by the selected input field type-specific tool can be generated. One or more graphical elements can be identified near the specified location. An area for the input field can be defined based at least in part on the identified graphical elements near the specified location. The identified graphical elements can include one or more graphical elements which represent lines or text in the electronic document. An input field can be generated having an area defined based at least in part on a distance between one or more of the identified graphical elements and the specified location. Metadata can be associated with the generated input field. The metadata can include information describing a name of the input field, a type of the input field, an appearance of the input field, or type-specific characteristics of the input field.

Generating an input field can include defining a perimeter at the specified location. The perimeter can be expanded until one or more edges of the perimeter intersect one or more of the identified graphical elements. User input entering information into the generated input field can be received. The generated input field can be stored.

In general, in another aspect, the invention features computer-implemented methods and apparatus, including computer program apparatus, implementing techniques for generating input fields in an electronic document in a fill-in mode of an application program. The techniques include representing an electronic document to a user, receiving user input specifying a location in the electronic document, identifying one or more graphical elements in the electronic document near the specified location in the electronic document, generating an input field in the electronic document at the specified location based at least in part on the identified graphical elements, receiving user input entering information into the generated input field, and storing the generated input field and the information.

Advantages that can be seen in implementations of the invention can include one or more of the following. Users and publishers can easily generate input fields in an electronic document. Input fields can be generated at locations specified by a user, without requiring the user to have any special knowledge or expertise in the creation of input fields. The user need not even be aware that an input field is being generated where none existed before. Input fields can be generated in an authoring or publishing mode (i.e., by a publisher at design time). Alternatively, input fields can be generated by a user at a location in an electronic document where none was provided by the publisher, in a fill-in mode (i.e., at runtime). Generated input fields can be added to a document file representing the electronic document. Information entered into the input fields can be added to the document file of the electronic document. Optionally, the input fields and/or the information entered into the input fields can be stored in files independent of the document file.

The details of one or more embodiments of the invention are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
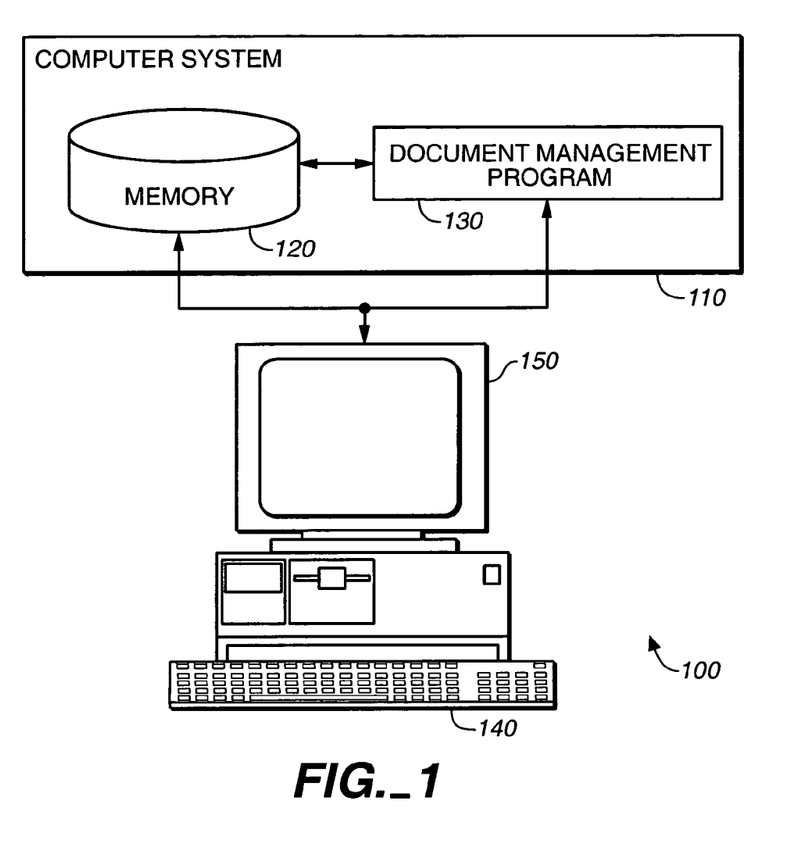
FIG. 1 is a block diagram illustrating a document management system suitable for use in implementations of the present invention.

FIG. 1 illustrates a document management system 100 that includes a general-purpose programmable digital computer system 110 of conventional construction, including a memory 120 and a processor for running a document management program 130 which can be implemented, for example, in a conventional document management program such as the Adobe Acrobat® program. Document management system 100 also includes input devices 140, such as a keyboard, mouse or digitizing pen, and output devices such as a display monitor 150. Optionally, document management system 100 also includes conventional communications hardware and software by which computer system 110 can be connected to other computer systems, such as over a network.

Figure 2:
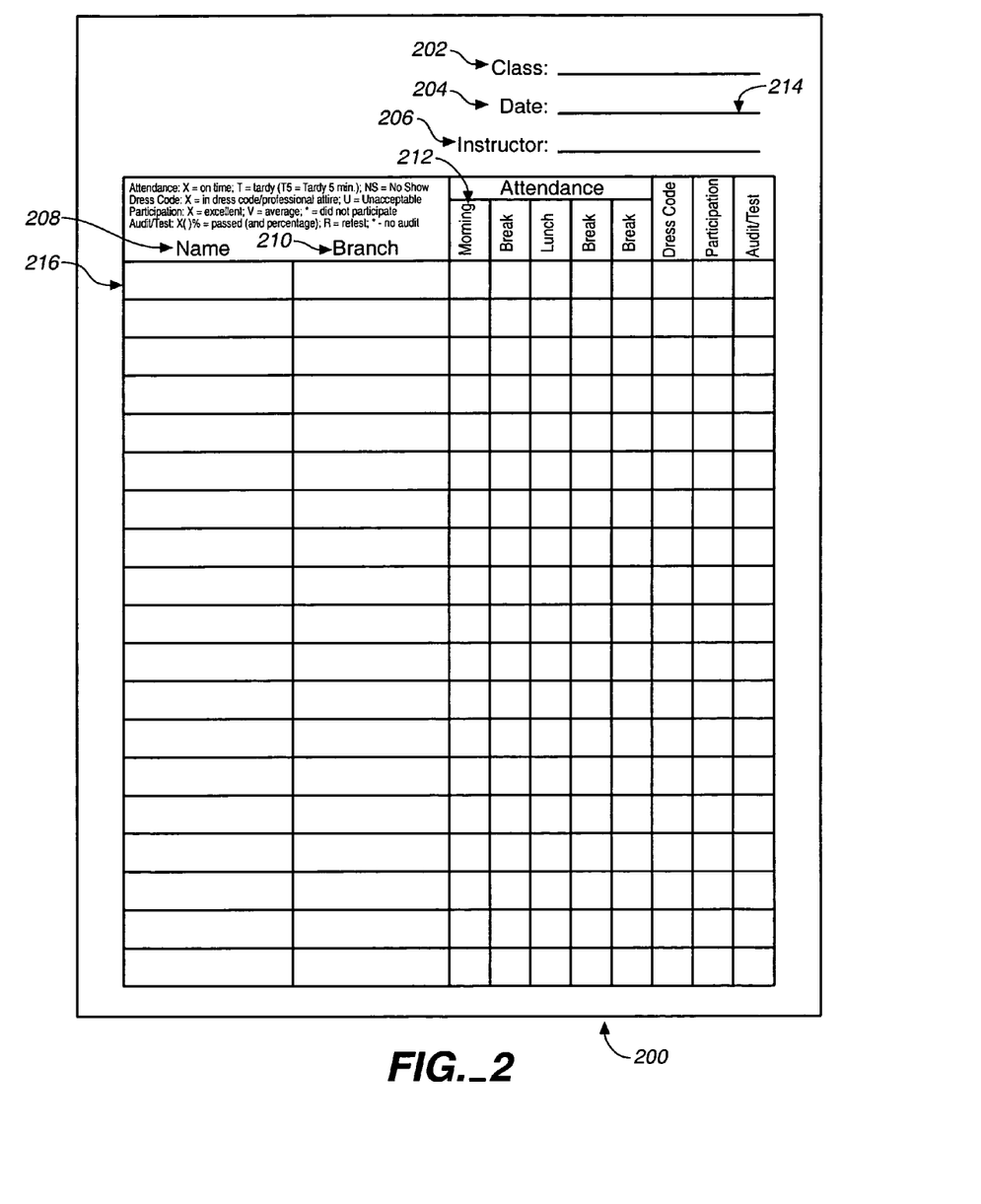
FIG. 2 illustrates an electronic document containing multiple locations at which a user might want to enter information.

FIG. 2 illustrates an example of an electronic document 200 that can be generated and/or displayed by a document management program 130 running on computer system 110. Electronic document 200 includes a number of graphical elements, such as text, lines, and images, including graphical elements defining areas that may represent locations at which a user might write information in a paper version of electronic document 200, such as locations 202-212. Input fields can be created at each location 202-212 so that a user, using an input device, can enter information into the input fields through the user interface of document management program 130. For example, using a keyboard, a user can type in a date into an input field, such as a text form field, generated for location 204. A generated input field, including its associated information, can be associated with the document file representing the electronic document as described in greater detail below.

Figure 3:
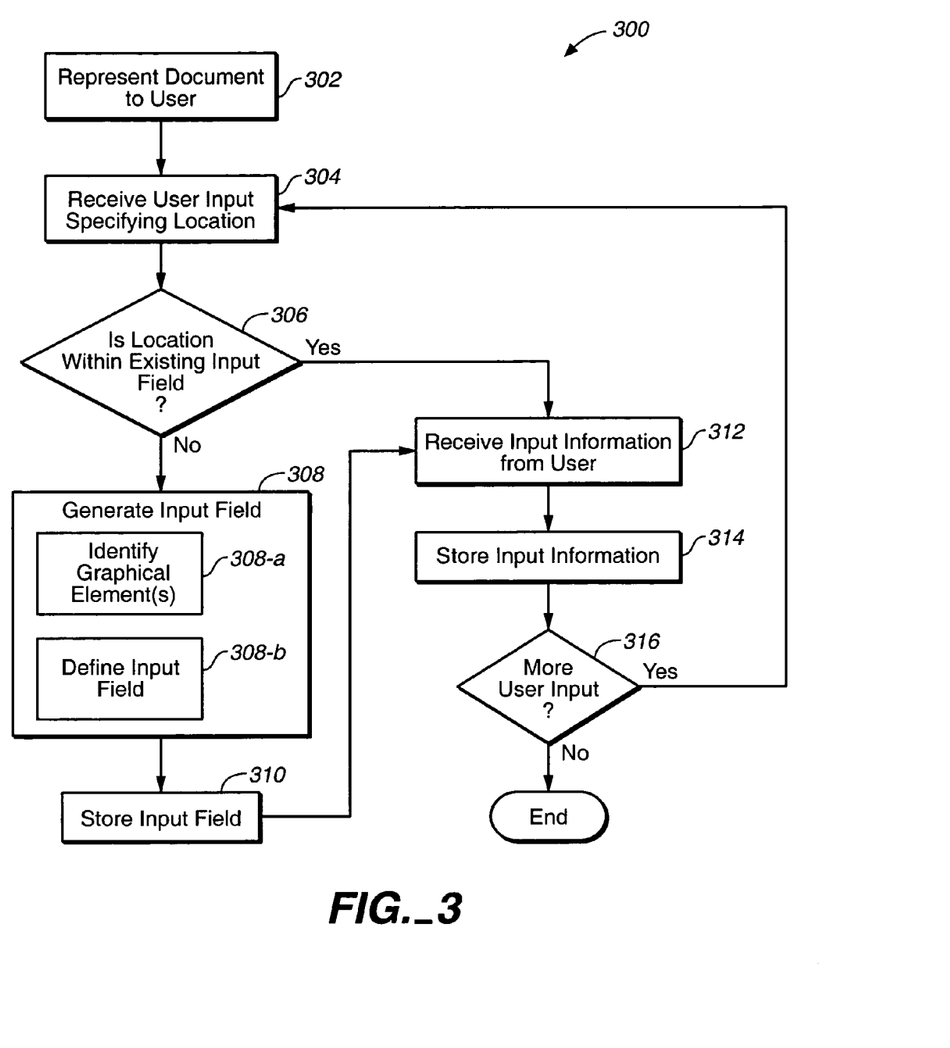
FIG. 3 is a flow chart for generating an input field in an electronic document.

FIG. 3 is a flowchart describing a technique for generating an input field in an electronic document. The technique can be implemented in an input field creation module of document management program 130. The technique can be applied to one or more locations in an electronic document (which can be a PDF document or other electronic document). The electronic document includes one or more graphical elements, such as text, lines, and images, which can be represented in vector form, raster form, or in hybrid form.

The document management system 100 represents an electronic document to a user (step 302). The electronic document can be represented to a user, for example by displaying the electronic document on monitor 150. The system receives user input specifying a location in the electronic document (step 304). The specified location can be a single coordinate location (i.e., a point) in the electronic document. The user input can consist of a single action or input from a pointing device, such as a single mouse click, performed, for example, when a cursor has been positioned at a desired location in the electronic document. The user input can also be other inputs—e.g., the placement of a digitizing pen at a desired location in an electronic document displayed on a screen of a PDA.

In one implementation, the user input is received in an authoring or publishing mode of a document management program 130 that is representing an electronic document to a publisher. The authoring mode is a mode of operation of the document management program during which the publisher is able to create and/or design the appearance of an electronic document, or to create input fields in a previously existing electronic document, generally without entering information into the input fields. Optionally, the publisher can specify input field metadata including, e.g., the name or type of the input field, or a default value for the input field, in the authoring mode. Alternatively, the user input is received in a fill-in mode of a document management program 130 that is representing the electronic document to a user. The fill-in mode is a mode of operation of the document management program during which the user is able to enter information into one or more input fields in an electronic document generated by the document publisher.

The system 100 determines whether the specified location contains an input field (step 306). If an input field already exists at the specified location (e.g., the user has specified a location within an existing input field), the input field is activated and the user can enter information into the input field (step 312). Typically, the type of information that the user may enter into the input field is limited by the type of the input field—for example, text in a text field, a check mark or "x" in a check box field, graphical content in a sketch field, and so on.

If the system determines that the specified location does not contain an input field, then the system generates an input field at the specified location based on one or more graphical elements in the electronic document (step 308). The input field can be generated based on graphical elements that are near (e.g., within a pre-determined distance of) the specified location. The pre-determined distance can be set by a publisher or user. The pre-determined distance can also be programmed to a default value.

In response to the user input specifying a location, the system identifies one or more graphical elements near the specified location in the electronic document (step 308-a). Conventional raster-based edge detection techniques, vector-based edge detection techniques, text detection techniques, and/or image detection techniques, or combinations thereof, can be used to detect graphical elements in an electronic document. Examples of raster-based edge detection techniques can be found in U.S. patent application Ser. No. 09/127,583, filed Jul. 31, 1998, to Stephan Yhann, assigned to the assignee of the present application, which is incorporated by reference herein. Examples of vector-based edge detection techniques can be found in U.S. Pat. No. 6,031,544, entitled "Vector Map Planarization and Trapping" to Stephan Yhann, issued Feb. 29, 2000, assigned to the assignee of the present application, which is incorporated by reference herein. Thus, for example, if the graphical elements of the electronic document are described in raster form, a conventional raster-based edge detection technique implementing the Hough transform can be used to identify one or more lines in an electronic document, such as line 214 in electronic document 200. If the graphical elements of the electronic document are described in vector form, a conventional vector-based edge detection technique can be used to identify edges implicitly within the vector display list (i.e., wherever a line is drawn, at least one edge exists and wherever a rectangle is drawn, four edges exist). If the graphical elements are described in hybrid form, then a raster-based edge detection technique can be used in combination with a vector-based edge detection technique to identify lines or edges in an electronic document.

In some electronic documents the graphical elements can be skewed, which can interfere with some detection techniques. For example, if a paper version of a document is misaligned during scanning, the entire electronic version of the paper document will be skewed. In such cases, the skewing can be corrected using conventional de-skewing techniques such as those described in U.S. patent application Ser. No. 09/784,931, to Andrei Herasimchuk, filed Feb. 15, 2001, assigned to the assignee of the present application, the disclosure of which is incorporated herein by reference.

At each specified location, the system defines an area for the input field based on the identified graphical elements (step 308-b). Generally, the area of an input field can be defined such that the input field does not overlap (or cover) other graphical elements in the image. Alternatively, the area of the input field can be defined such that the input field will overlap other elements, such as text, in the image. For example, an input field can be defined as a rectangle (e.g., using edge detection techniques to detect lines in the image) that includes a text label in, e.g., the upper left corner, that describes or names the field. In one implementation, the system can be configured to detect only certain types of graphical elements (e.g., lines), while disregarding other types (e.g., text). Typically, a user will desire to create an input field in a location in an electronic document, such as location 216 (shown in FIG. 2). Once the user clicks into location 216, the system defines an area for the input field to be substantially equal to the area of the rectangular box surrounding location 216.

The system stores the generated input field (step 310). The input field can be stored as part of the document file which represents the electronic document. Optionally, system 100 can store the generated input field in one or more input field files independent of the document file. When the input field is stored in an input field file independent of the document file, linking information can be associated with each of the input field file and the document file to link the files together. Either before or after generating an input field, the system can prompt the user to specify metadata to be associated with the input field. Metadata can include a unique label for the input field (e.g., distinct from other input field labels in the electronic document) and type of the input field (e.g., form field, sketch field, text field, and the like). Metadata can also include information relating to the size and appearance of the input field, and to type-specific characteristics such as the font, font size, and style associated with a text field, a drawing tool or style associated with a sketch field, and the like. The metadata can be stored as part of the input field or as attribute(s) of the input field. When the creation of the input field is complete, the input field is activated, and the user can enter information into the input field as described above in step 312.

Following step 312, the system stores the information entered into the input field (step 314). The information entered into the input field can be stored as part of the document file which represents the electronic document. For example, the information can be stored as an attribute of the input field in the electronic document. If the input field is stored in an input field file independent of the document file, the information can be stored as part of the input field file. The information can also be stored in an information file independent of any associated input field file and/or document file. When the information is stored in an information file independent of the input field file and the document file, linking information can be associated with each of the information file, the input field file and the document file to link the files together. For example, information a user enters into an input field, such as a PDF form field, can be stored in an independent information file such as an FDF (Forms Data Format) file which contains linking information to the PDF form field.

Upon receiving more user input specifying locations in the electronic document (the "YES" branch of step 316), the system repeats steps 304-314.

Figure 4:
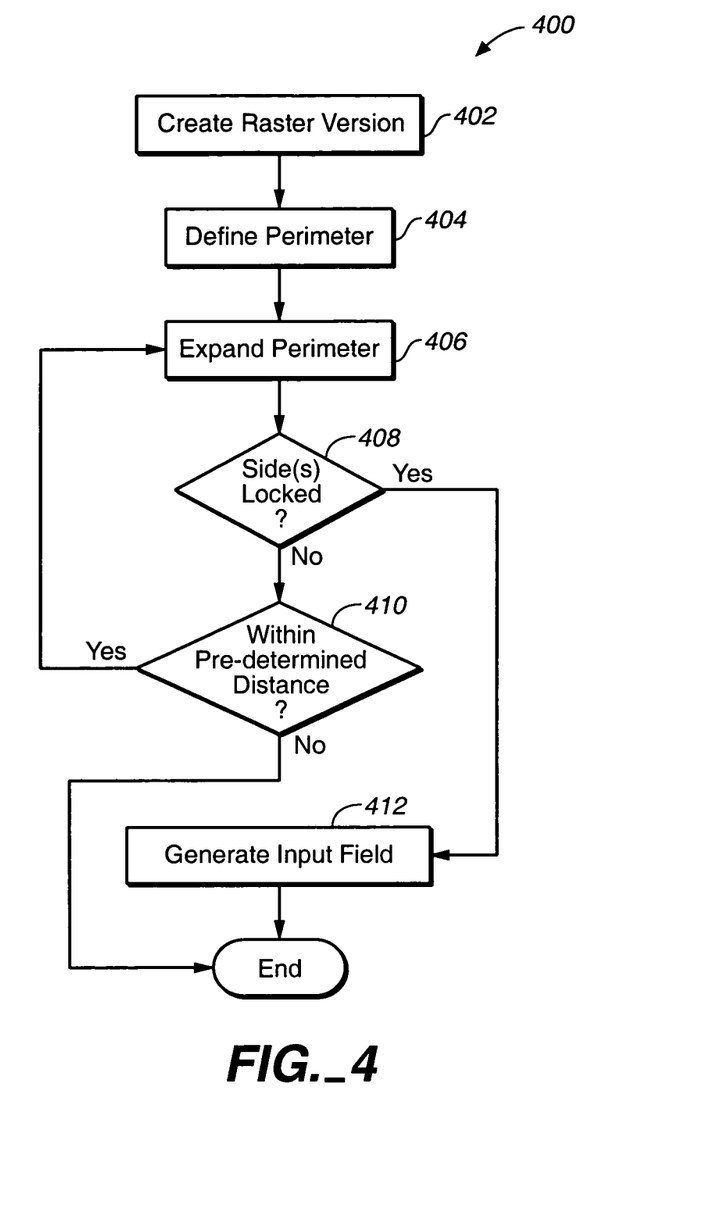
FIG. 4 is a flow chart of an example of generating an input field.

FIG. 4 illustrates in more detail an example of generating an input field based on identified graphical elements (step 308 in FIG. 3). In response to the user input specifying a location, in one implementation, the system creates a transient raster version of the electronic document (step 402) so that raster-based edge detection techniques can be used to identify graphical elements near the specified location. The transient raster version can encompass a portion of the electronic document, such as a small portion in the vicinity of the specified location. The transient raster version of the electronic document can be at any convenient resolution, for example at a resolution at which the document is displayed to the user. Once the graphical elements are identified (as described below), the raster version of the electronic document can be discarded. Alternatively, a display buffer (or frame buffer) can be used to create a raster version of the electronic document.

The system defines a small perimeter at a location in the raster version that corresponds to the specified location (step 404). Thus, for example, the system can define a rectangle at the location in the raster version corresponding to the specified location. The system iteratively expands the perimeter (step 406). In the example above, the system can move each side of the rectangle in an outward direction by a pre-determined distance until the side intersects with a graphical element (e.g., a line) in the electronic document. When the system determines that a given side of the perimeter has intersected with a graphical element in the electronic document, that side is locked (i.e., the perimeter will no longer be expanded in that direction). If a specified number of sides of the perimeter have not locked (i.e., if all or a minimum number of sides have not intersected with a graphical element), (the "NO" branch of step 408), the system checks whether the perimeter has expanded to a predetermined threshold distance from the specified location (step 410). If not, the system repeats steps 406 and 408 until the minimum number of sides have locked, or until the threshold distance has been reached. If the sides of the perimeter have not intersected with a graphical element within the rasterized portion of the electronic document, a larger portion of the electronic document surrounding the specified location can be rasterized to create a larger transient raster version of the electronic document. When the minimum number of sides of the perimeter have locked, the system generates an input field in the area defined by the area of the perimeter (step 412).

Optionally, if less than all sides of the perimeter have locked, the system can generate the input field with an area defined by default dimensions for those sides where no graphical element was encountered. Thus, if only a bottom side of the perimeter has locked within the threshold distance (e.g., the system has detected only a line extending below the specified location), the system can be configured to generate an input field (e.g., a signature field) based on the characteristics of the detected graphical elements (e.g., the length of the line), the distance from the graphical element to the specified location, or other factors, such as the font size of nearby text or default values.

If no graphical elements are detected within the threshold distance, the system can be configured to generate an input field based solely on default values such as pre-determined input field dimensions set by a user.

Optionally, a user accesses an input field creation tool by making an appropriate selection in a user interface of document management program 130. Thus, for example, the user interface of document management program 130 can provide one or more selectable icons representing an input field tool or tools that can be invoked to generate input fields in an electronic document. The icon or icons can represent input field type-specific tools, with each such tool being selectable to create a particular type of input field (e.g., form field, sketch field, text field, and the like). Either before or after generating the input field based on graphical elements in the electronic document, the system can specify metadata for the input field. Metadata can be specified based on user input (e.g., responses to a prompt, such as through a dialog box having fields for a set of parameters for a specified input field type), or based on default parameters.

The invention can be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in specially-designed ASICs (application-specific integrated circuits).

A number of embodiments of the invention have been described. Nevertheless, it will be understood that various modifications may be made without departing from the spirit and scope of the invention. For example, input fields can be generated based on any graphical element in an electronic document, including graphical elements that are far from the specified location. Accordingly, other embodiments are within the scope of the following claims.

What is claimed is:

1. A computer-implemented method, comprising:
    representing with a computing device an electronic document to a user, the electronic document having one or more graphical elements, each graphical element being either text, line art, or an image;
    receiving at the computing device user input specifying a single coordinate location in the electronic document; and
    in response to the received user input, and by the computing device without further user input beyond the specification of the single coordinate location:
        expanding each side of a rectangular perimeter defined at the coordinate location outward until a determination is made using computerized edge, text, or image detection techniques that one or more sides of the rectangular perimeter intersect with one of the graphical elements;
        locking the one or more intersecting sides so that the intersecting sides of the rectangular perimeter no longer expand outward;
        expanding the non-intersecting sides outward, the expansion of the non-intersecting sides ceasing when at least one of the non-intersecting sides has expanded to a predetermined threshold distance from the single coordinate location; and subsequent to the expansion of the non-intersecting sides, generating a new rectangular text input field in an area defined by an area of the perimeter, the rectangular text input field providing a location at which a user can type text into the electronic document.

2. The method of claim 1, wherein the determination includes:
   creating a transient raster version of the electronic document; and
   using a raster-based edge detection technique on the transient raster version of the electronic document to determine whether one or more sides of the perimeter intersect one or more graphical elements in the electronic document.

3. The method of claim 2, wherein the raster-based edge detection technique uses a Hough transform to identify one or more graphical elements in the electronic document.

4. The method of claim 2, wherein the transient raster version encompasses a portion of the electronic document in a vicinity of the single coordinate location.

5. The method of claim 1, wherein the predetermined threshold distance is defined by default dimensions of the rectangular text input field.

6. The method of claim 1, wherein:
   one of the sides of the rectangular perimeter intersects with a graphical element that is a line; and
   the predetermined threshold distance is based on a length of the line.

7. The method of claim 1, wherein the predetermined threshold distance is based on a font size of text that is displayed in the electronic document nearby to the rectangular perimeter.

8. A computer readable storage device having stored thereon a computer program product for generating input fields in an electronic document, comprising instructions operable to:
   represent with a computing device an electronic document to a user, the electronic document having one or more graphical elements, each graphical element being either text, line art, or an image;
   receive at the computing device user input specifying a single coordinate location in the electronic document; and
   in response to the received user input, and by the computing device without further user input beyond the specification of the single coordinate location:
      expand each side of a rectangular perimeter defined at the coordinate location outward until a determination is made using computerized edge, text, or image detection techniques that one or more sides of the rectangular perimeter intersect with one of the graphical elements;
      lock the one or more intersecting sides so that the intersecting sides of the rectangular perimeter no longer expand outward;
      expand the non-intersecting sides outward, the expansion of the non-intersecting sides ceasing when at least one of the non-intersecting sides has expanded to a predetermined threshold distance from the single coordinate location; and
      subsequent to the expansion of the non-intersecting sides, generate a new rectangular text input field in an area defined by an area of the perimeter, the rectangular text input field providing a location at which a user can type text into the electronic document.

9. The computer readable storage device of claim 8, wherein the determination includes:
   creating a transient raster version of the electronic document; and
   using a raster-based edge detection technique on the transient raster version of the electronic document to determine whether one or more sides of the perimeter intersect one or more graphical elements in the electronic document.

10. The computer readable storage device of claim 9, wherein the raster-based edge detection technique implements a Hough transform to identify one or more graphical elements in the electronic document.

11. The computer readable storage device of claim 9, wherein the transient raster version encompasses only a portion of the electronic document in a vicinity of the single coordinate location.

12. The computer readable storage device of claim 9, wherein the predetermined threshold distance is defined by default dimensions of the rectangular text input field.

13. The computer readable storage device of claim 9, wherein:
   one of the sides of the rectangular perimeter intersects with a graphical element that is a line; and
   the predetermined threshold distance is based on a length of the line.

14. The computer readable storage device of claim 9, wherein the predetermined threshold distance is based on a font size of text that is displayed in the electronic document nearby to the rectangular perimeter.

15. A system for generating input fields in an electronic document, the system comprising:
   at least one programmable processor;
   a display device coupled to the at least one programmable processor;
   computer-readable medium coupled to the at least one programmable processor, comprising instructions that when executed by the at least one programmable processor perform operations including:
      representing an electronic document to a user on the display device, the electronic document having one or more graphical elements, each graphical element being either text, line art, or an image;
      receiving user input specifying a single coordinate location in the electronic document; and
      in response to the received user input, and by the computing device without further user input beyond the specification of the single coordinate location:
         expanding each side of a rectangular perimeter defined at the coordinate location outward until a determination is made using computerized edge, text, or image detection techniques that one or more sides of the rectangular perimeter intersect with one of the graphical elements;
         locking the one or more intersecting sides so that the intersecting sides of the rectangular perimeter no longer expand outward;
         expanding the non-intersecting sides outward, the expansion of the non-intersecting sides ceasing when at least one of the non-intersecting sides has expanded to a predetermined threshold distance from the single coordinate location; and
         subsequent to the expansion of the non-intersecting sides, generating a new rectangular text input field in an area defined by an area of the perimeter, the rectangular text input field providing a location at which a user can type text into the electronic document.

16. The system of claim 15, wherein the determination includes:

creating a transient raster version of the electronic document; and using a raster-based edge detection technique on the transient raster version of the electronic document to determine whether one or more sides of the perimeter intersect one or more graphical elements in the electronic document.

17. The system of claim 16, wherein the raster-based edge detection technique implements a Hough transform to identify one or more graphical elements in the electronic document.

18. The system of claim 16, wherein the transient raster version encompasses only a portion of the electronic document in a vicinity of the single coordinate location.

19. The system of claim 16, wherein the predetermined threshold distance is defined by default dimensions of the rectangular text input field.

20. The system of claim 16, wherein:
one of the sides of the rectangular perimeter intersects with a graphical element that is a line; and
the predetermined threshold distance is based on a length of the line.

21. The system of claim 16, wherein the predetermined threshold distance is based on a font size of text that is displayed in the electronic document nearby to the rectangular perimeter.

\* \* \* \* \*